United States Patent [19]

Bricot

[11] Patent Number: 4,901,089
[45] Date of Patent: Feb. 13, 1990

[54] METHOD AND DEVICES FOR THE RECORDING OF PICTURES BY LASER

[75] Inventor: Claude Bricot, Villejuif, France
[73] Assignee: Thomson-CSF, Puteaux, France
[21] Appl. No.: 286,513
[22] Filed: Dec. 19, 1988
[51] Int. Cl.[4] ............................ G11B 7/00; G01D 9/42
[52] U.S. Cl. ................................. 346/76 L; 346/108;
369/44; 369/100
[58] Field of Search ................. 346/76 L, 108, 107 R, 346/160; 369/100, 106, 121, 44

[56] References Cited

U.S. PATENT DOCUMENTS 4,584,612 4/1986 Ono.
4,727,381 2/1988 Bille ................................... 346/108

FOREIGN PATENT DOCUMENTS 56-113494 9/1981 Japan.
59-31190 2/1984 Japan.
60-052390 3/1985 Japan.

OTHER PUBLICATIONS

IBM Technical Disclosure Bulletin, vol. 24, No. 2, Jul. 1981, "Multi-Color Recording Medium".

Primary Examiner—B. A. Reynolds
Assistant Examiner—Scott A. Rogers
Attorney, Agent, or Firm—Roland Plottel

[57] ABSTRACT

A method for recording pictures wherein a material to be scanned by a laser beam comprises a first layer laid on a substrate to form a picture zone and a reading zone and a second layer laid on the picture zone only which is capable of absorbing laser radiation. The laser beam is capable of double relative motion with respect to the above material with a first fast motion along a first axis and with a second motion, slow in comparison with the first motion, along a second axis which, for example, may be perpendicular to the first axis. The power of the laser beam is modulated as a function of the information to be recorded in synchronism with the above mentioned first motion. The laser beam is guided by information from the reading zone which describes the picture zone where the picture has to be formed in strips parallel to the first axis by the destruction or non-destruction of the absorbent layer thereon, thus causing the first layer to be revealed or not revealed depending on the power of the laser beam and, therefore, on the information to be recorded. After recording the reading zone is removed.

6 Claims, 3 Drawing Sheets

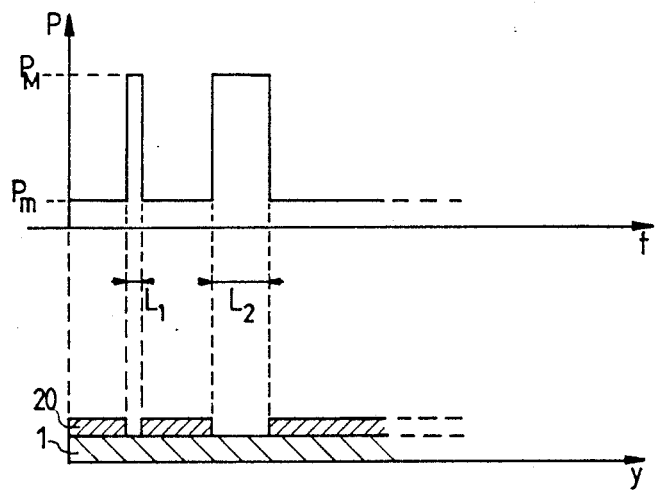
FIG. 3a
FIG. 3b
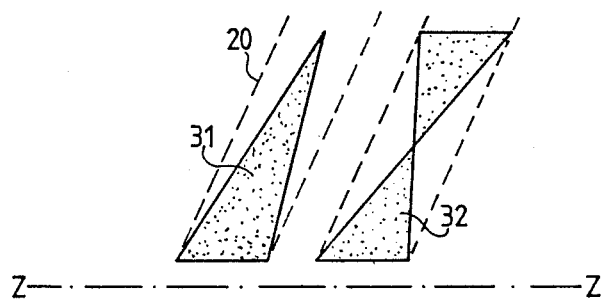
FIG. 3c
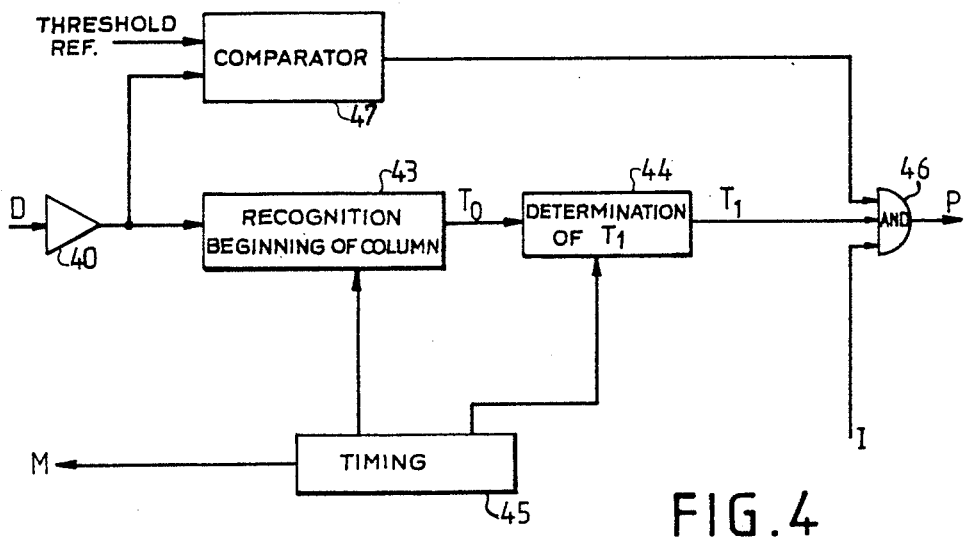
FIG. 4

METHOD AND DEVICES FOR THE RECORDING OF PICTURES BY LASER

BACKGROUND OF THE INVENTION

1. Field of the Invention

An object of the present invention is a method to record images or pictures by laser as well as means to implement it.

In the present description, the term "picture" refers to graphic representations as well as to printed text and photographs, etc.

In certain applications, a picture has to be formed on a medium which is hard to falsify or counterfeit.

2. Description of the Prior Art

Various methods are known for this purpose. Among them, we might cite the printing of blank bills where a chemical transfer process is used. Various special devices are used to make this method hard to falsify but, for certain uses, the method does not make it difficult enough to counterfeit.

Other methods, such as those used to manufacture digital optical disks, use a mechanism for the ablation of a layer selected to absorb incident radiation. Once the absorbent layer is removed by radiation, it lets the medium appear at specific places, thus forming an picture. These methods, however, do not give good "rendering", namely quality (picture definition, contrast, etc.) similar to that of pictures made by printing.

An object of the present invention is therefore, the making of a picture with rendering quality comparable to that of a printed picture which is as difficult as possible to falsify and as difficult as possible to counterfeit, a method of this type being applied notably in the making of top security documents such as identity papers for example.

SUMMARY OF THE INVENTION

The method according to the invention enables these goals to be met through the use of:

A first layer of material, laid on a substrate and forming two zones, a picture zone and a reading zone. The first layer is coated on the picture zone with a second layer capable of absorbing laser radiation.

A laser beam capable of a double relative motion with respect to the above material, i.e.:
* a first fast motion along a first axis;
* a second motion, slow in comparison with the first motion, along a second axis which, for example, may be perpendicular to the first axis;

Means to modulate the power of the laser beam as a function of the information to be recorded in synchronism with the above-mentioned first motion. The laser beam is guided by means of the reading zone and describes the picture zone where the picture has to be formed in strips parallel to the first axis, by the destruction or non-destruction of the absorbent layer thereon, thus causing the first layer to be revealed or not revealed, depending on the power of the beam and, therefore, on the information to be recorded. After recording, the reading zone is removed.

BRIEF DESCRIPTION OF THE DRAWINGS

Other objects, special features and results of the invention will emerge from the following description, illustrated by the appended figures, of which:

FIGS. 3a, 3b and 3c, are explanatory drawings of the working of the device according to the invention;

FIG. 4 shows an embodiment of the electronic means for controlling the optical means of FIG. 2, to implement the method according to the invention.

In these differents figures, the same references are repeated for the same elements.

DESCRIPTION OF PREFERRED EMBODIMENTS

Figure 1A:
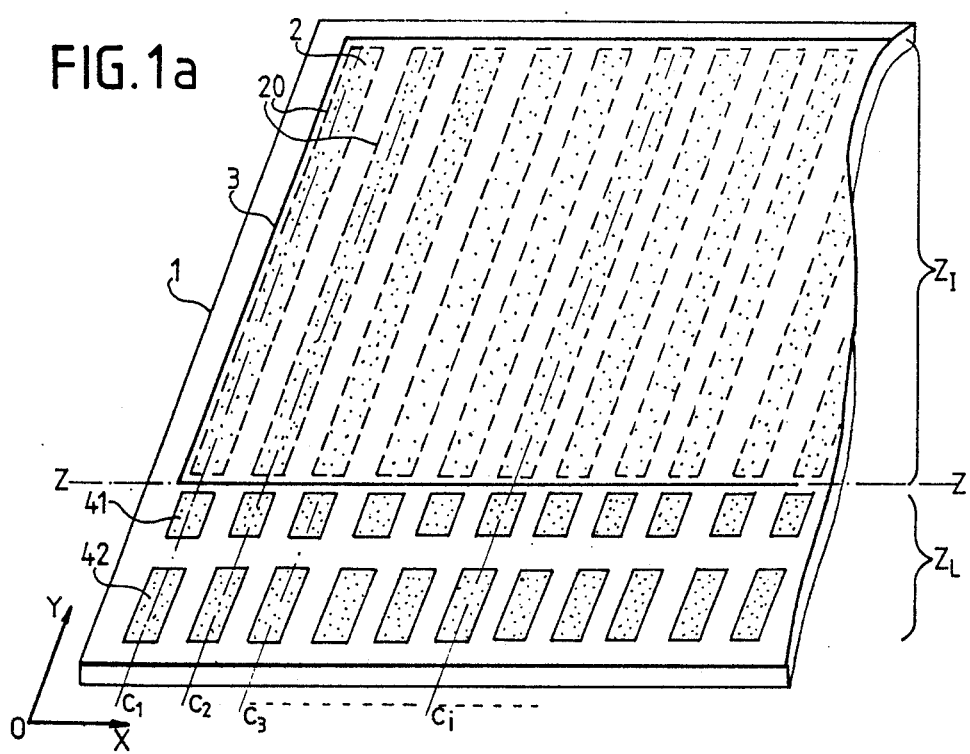
FIGS. 1a and 1b show different embodiments of the medium of the picture.

FIG. 1a shows a first embodiment of the medium of the picture according to the invention.

This figure therefore shows a substrate 1, for example, made of paper, cardboard or plastic, on which two zones are defined: a picture zone $Z_I$ and a reading zone $Z_L$ separated by an axis ZZ, parallel to the axis OX of an orthonormal reference OXY. In the picture zone $Z_I$, a first material 2 is deposited in strips 20 parallel to the axis OY, thus forming columns marked $C_1$, $C_2$, $C_3$ . . . $C_i$ . . . This material 2 is, for example, an ink deposited by a photoengraving, smooth cutting, offset or other type of method.

In the picture zone $Z_I$, there is deposited a layer 3 of a second material chosen to absorb a pre-defined radiation such as a laser radiation. Preferably, this material 3 is characterized by a low melting temperature. However, it may be preferable, for certain applications, that this temperature is not too low, for example about 200° C., to remain greater than the temperatures at which the media plastifications are usually made. The layer 3 is, for example, organic or metallic. It may have a small thickness, its aborption being determined, for a given radiation, by its composition and thickness. For example, a telluride layer of about 200 Å would be appropriate.

In that part of the medium corresponding to the reading zone $Z_L$, strips of the first material (2) have also been deposited along the columns $C_1$, $C_2$ . . . $C_i$. These strips may or may not be continuous: for example, they are shown in FIG. 1a in two patterns marked 41 and 42, also aligned in the columns C. It must be noted that the material forming the columns or patterns of the reading zone $Z_L$ may be different from the material 2. For the clarity of the figure, the surfaces of the strips 20 and the patterns 41 and 42 have been shown with dashes.

Figure 1B:
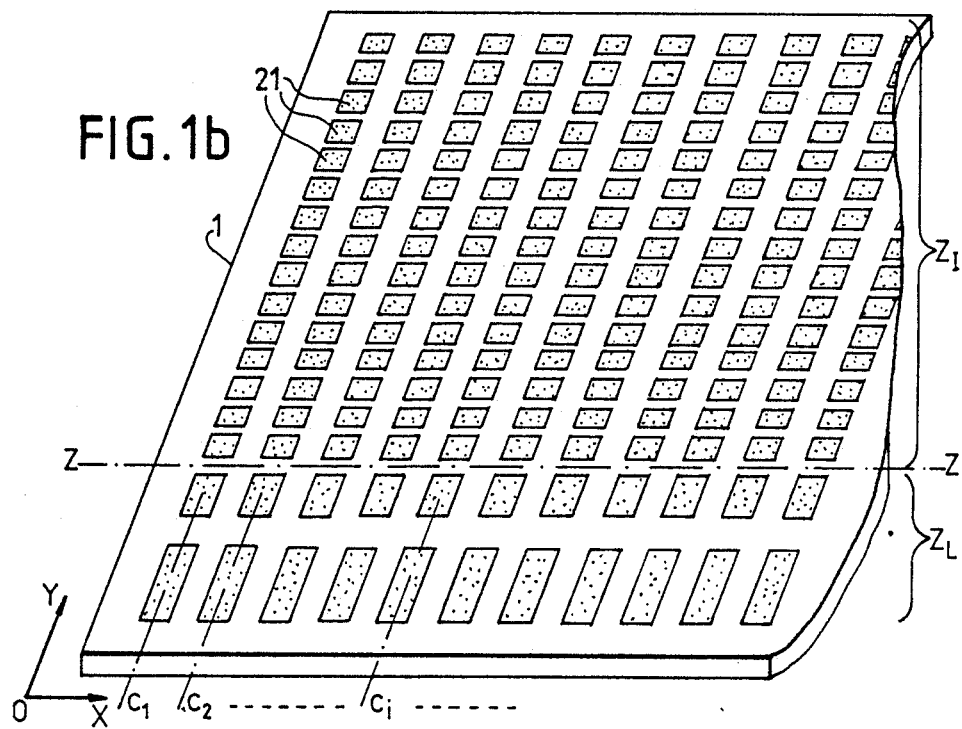

FIG. 1b shows an embodiment alternative to that of the previous figure. The embodiment shown in FIG. 1b is different in that the strips 20 of the picture zone $Z_I$ are now made in discrete form by means of microsurfaces 21, aligned in columns C as above. For example, microsurfaces may be 20 μm square.

To simplify, the figure, the layer 3 of absorbent material has not been shown.

Figure 2:
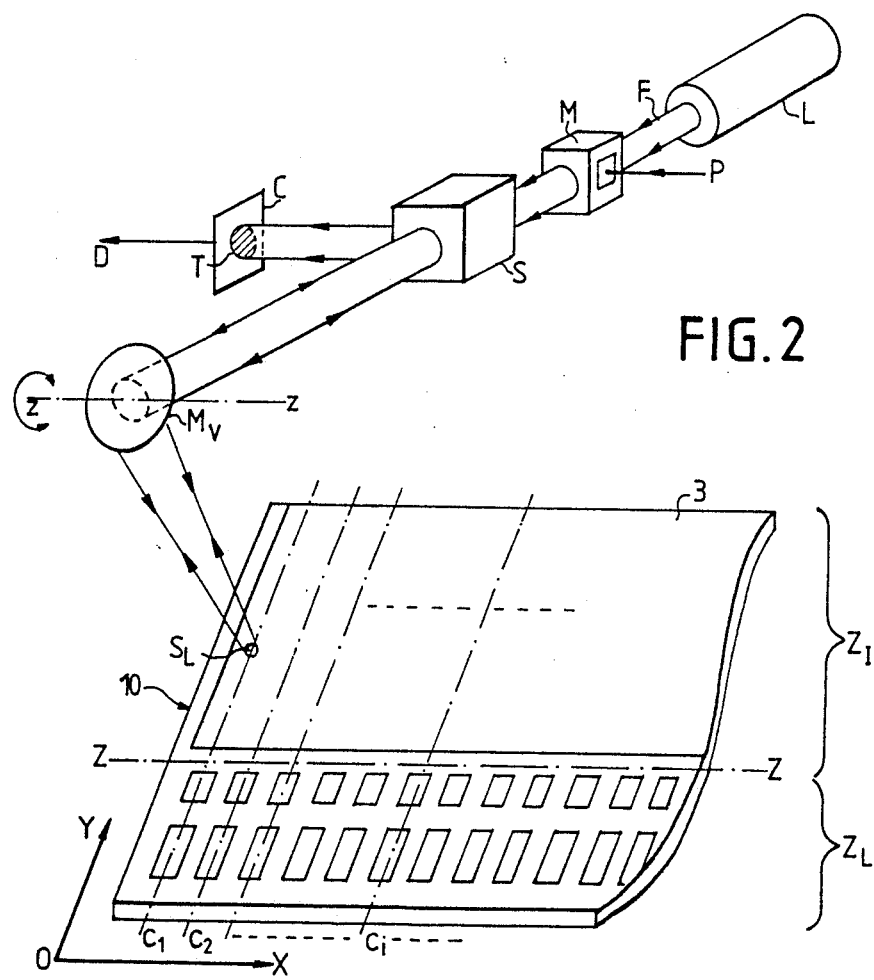
FIG. 2 shows an embodiment of the optical means for recording the picture.

FIG. 2 shows an embodiment of the means for the optical recording of the picture in the above medium.

This figure shows, as an example, and under the general reference 10, the device described with reference FIG. 1, comprising the reading zone $Z_L$ and the picture zone $Z_I$, the latter being coated with the absorbent material 3.

The recording device has a laser L emitting a light beam F towards the modulator M. This modulator M is controlled by a signal P. This control enables the power of the laser L to be modulated according to the information to be recorded on the device 10. In leaving the modulator M, the light energy is directed towards a vibrating mirror $M_v$, through separation means S. The mirror M can oscillate on an axis zz, parallel to the axis OX. The mirror M sends on the laser beam F towards the device 10, on which it forms a spot $S_L$.

If necessary, the device may further have means (not shown) to focus the beam F on the device 10.

Depending on the power of the beam, as controlled by the above signal P, the device works in one of the two following ways:

the first mode of operation corresponds to a case where the luminous power is low, for example between 1 mW and 3 mW;

the second mode of operation corresponds to high luminous power, for example a few tens of milliwatts, enabling the local ablation of the layer 3 and thus revealing the material 2.

The zones in which the material 2 is revealed together form the picture sought.

Controlling the motion of the mirror M around the axis zz enables the spot $S_L$ of the laser beam to describe a column C of the picture zone $Z_I$. Besides, the device 10 is moved along the axis OX by a translational motion with respect to the optical device, so as to enable to the laser beam to go from one column to the next one. This motion may be either discontinuous, limited to the time available between the spot scan motions along the axis OY, or continuous and slow with respect to the scan motion along OY, so as to enable writing in parallel columns.

As a result, by means of the modulator (M) control signal (P), a picture is recorded on the zone $Z_I$, the quality of which depends on the parameters chosen, notably for the control of the beam F power and the spot $S_L$ scan speeds.

In an alternative embodiment, the substrate 1 has a color different from that of the strips 20 or the microsurfaces 21, in order to make any falsification more difficult: for an attempt at falsification then entails a high probability of revealing the medium instead of the material 2.

Various alternatives are possile for the control of the laser beam, and are illustrated by FIGS. 3a to 3c.

The light pulses may be of constant width according to a constant frequency, and the recording is then of the binary type.

In one alternative embodiment, the light pulses may be of variable width so as to enable the appearance of a pattern with a variable size. This is what is shown in FIG. 3a.

In this FIG. 3a, the power P of the laser beam F has been shown as a function of time. The power P changes between a minimum level $P_m$ and a maximum level $P_M$ with a variable pulse width ($L_1, L_2...$).

FIG. 3b shows a partial section of the device 10, made along a column when the latter receives the modulated laser beam as shown in FIG. 3a.

In this section, the substrate 1 is shown partially covered by a strip 20. For, this strip 20 remains when the power of the laser is at the minimum level $P_m$ and is, on the contrary, eliminated by the laser beam on widths corresponding to the pulse widths $L_1$ and $L_2$.

If the columns are formed by microsurfaces, as described with reference to FIG. 1b, the pulses should be synchronized with these microsurfaces.

In an alternative embodiment, the power of the laser beam no longer changes in a binary form between two levels $P_m$ and $P_M$ as shown in FIG. 3a, but changes variably between these two levels. This makes it possible to destroy the absorbent layer 3 more extensively or less extensively and thus reveal patterns which are, for example, substantially triangular. This is shown, as an example, in FIG. 3c which shows the trace of two strips 20 and where differently shaped triangular patterns 31 and 32 appear. For the clarity of the drawings, only those zones where the material 2 appears have been shown with dashes.

Referring again to FIG. 2, the laser beam F is partially reflected by the device 10 towards the vibrating mirror $M_i$, and is then deflected, by separation means S, towards a photosensitive cell C where it forms a light spot T. The cell C gives an electrical detection signal D.

This detection signal is used, as shown further below in FIG. 4, to synchronize the scanning of the device 10 by the spot $S_L$ with the pieces of information constituting the picture, which form the signal P.

To this effect, the spot $S_L$ scans the totality of each column C, including the part in the reading zone $Z_L$. The pattern or patterns (41, 42 in FIGS. 1) of the reading zone $Z_L$ enable the recognition (detection) of the beginning of a column. For, the nature of the patterns 41, 42 (reflecting the beam more than the medium 1 or less than it) and their thickness as the case may be (causing off-centering of the spot T on the cell C in the event of excess thickness) cause variations, in the amplitude of the detection signal, which are characteristic of the start of a column. It must be noted that this detection cannot be realized on the column of the picture zone since the material 20 or 21 is there covered by the absorbing layer 3.

In an alternative embodiment, the patterns 41, 42 may vary from one column to the next one, thus further enabling each column to be identified.

FIG. 4 shows an embodiment of the electronic means for controlling the device according to the invention.

The electrical detection signal D is transmitted, after amplification in an amplifier 40, to a circuit 43 for the recognition (detection) of the beginning of a column.

Under the control of a timing device 45, comprising a clock and counters, the circuit 43 gives a signal corresponding to the instant $T_O$ of the beginning of the column of the picture zone $Z_I$. This signal may be, for example, the change of a binary signal to the state 0 and is intended for an AND gate type of logic circuit 46 which itself gives the modulator control signal P. In this embodiment, the signal indicating the instant $T_O$ goes, before being transmitted to the AND gate 46, to a circuit for determining the instant $T_1$ of the end of a column. This determining process is done from the instant $T_O$, by the addition of a constant interval corresponding to the time taken by the beam F to scan the column. In this example, the signal indicating the instant $T_1$ is formed by the same logic signal changing to the state 1. The circuit 44 is controlled by the timing circuit 45.

In the alternative embodiment shown in the figure, the device also has a comparator 47, comparing the detection signal from the amplifier 40 with a threshold. This enables the detection of an outgoing, if any, of the laser spot $S_L$ outside a strip 20. For, in this case, the difference in reflective power between the material 2 and the substrate 1 causes a variation (for example a reduction) in the amplitude of the signal D. The output signal of the comparator 47 is also connected to the AND gate 46. This AND gate again receives the information I to be recorded in the device 10, in synchronism with the instants $T_O$ and $T_1$, by means of a buffer memory for example.

The AND gate thus has the function of permitting the passage of the information I when the spot $S_L$ is in the picture zone $Z_1$ (between the instants $T_O$ et $T_1$) and, if necessary, only when it is properly aligned with a column through the action of the comparator 47. Finally, the timing device 45 controls the motion of the mirror $M_y$.

We have thus described a device on which a picture can be recorded by means of a laser beam, electrically controlled by a binary or non-binary signal representing the picture, giving excellent rendering which is difficult to counterfeit and difficult to falsify.

It must be noted that the reading zone part of the device is not necessarily made on the same medium as the picture zone. In any case, it is separated from the latter after recording the picture, in order to prevent the recognition of the column C.

It must also be noted that a picture can be recorded in color provided that, in the picture zone, there are microsurfaces 21 of different colors in a pre-defined arrangement (for example, in squares having four colors: blue, yellow, red and black) and that the laser beam is controlled accordingly.

The above description has, of course, been given as a non-restrictive example, and alternatives are possible within the scope of the invention. Thus, for example, it is possible to deposit an additional layer on the absorbent layer 3, this additional layer being transparent, having a thickness of the order of a half wavelength of the laser radiation and having the function of matching the air with the layer 3, thus restricting reflections on the surface of the layer 3. Thus, again, there has been described (FIG. 2) a motion of the device 10 with reference to the optical means but, of course, this is a relative motion and the optical means can also be in motion, with the device 10 being fixed if required.

What is claimed is:

1. A method for recording a picture on a medium device by means of a laser beam, said medium device comprising:
    a substrate
    a layer of a first material, arranged in columns on said substrate, said layer forming a picture zone and a reading zone;
    a layer of a second absorbent material, capable of being destroyed by the laser beam, laid on said picture zone of said first material;
    the laser beam being capable of a double relative motion with respect to the medium device:
    a first fast motion along a first axis;
    a second motion, slow in comparison with the first motion, along a second axis;
    the laser beam being guided on said columns by means of said reading zone and the power of the laser beam being modulated, as a function of said picture, in synchronism with said first motion so as to destroy or not destroy said second material, thus revealing or not revealing said first material, the zones of said picture zone where the first material is revealed forming said picture, said reading zone being removed after said recording.

2. A device for the recording, according to claim 1, of a picture on a medium device, said recording device comprising:
    means to produce the laser beam;
    means to modulate the power of the laser beam in accordance with an electrical signal representing the picture to be recorded;
    means to ensure the scanning by the laser beam of the medium device along the first axis;
    means to guide the laser beam on the columns of the medium device;
    means to synchronize this position with the picture to be recorded.

3. A medium device for recording a picture with a laser beam by means of the method according to claim 1, comprising:
    a substrate
    a layer of a first material arranged in columns on said substrate, said layer forming a picture zone and a reading zone;
    a layer of a second absorbent material deposited on the picture zone of said first material; the ablation of said second material being capable of revealing the first material in a configuration forming said picture;
    said reading zone being removable from said picture zone after said recording.

4. A medium device according to claim 3, wherein said first material is deposited on said substrate along continuous columns.

5. A medium device according to claim 3, wherein the first material is laid on said substrate in microsurfaces aligned according to said columns.

6. A recording device according to claim 5, wherein said microsurfaces have different colors, thus enabling the recording of the picture in color.

* * * * *